(12) United States Patent
Kuo et al.

(10) Patent No.: US 11,415,798 B2
(45) Date of Patent: Aug. 16, 2022

(54) AUGMENTED REALITY DEVICE

(71) Applicants: Industrial Technology Research Institute, Hsinchu (TW); Intellectual Property Innovation Corporation, Hsinchu (TW)

(72) Inventors: Shin-Hong Kuo, New Taipei (TW); Yi-Shou Tsai, Taipei (TW); Yu-Hsiang Tsai, Hsinchu County (TW); Kuan-Ting Chen, Yunlin County (TW)

(73) Assignees: Industrial Technology Research Institute, Hsinchu (TW); Intellectual Property Innovation Corporation, Taipei (TW)

( * ) Notice: Subject to any disclaimer, the term of this patent is extended or adjusted under 35 U.S.C. 154(b) by 0 days.

(21) Appl. No.: 16/296,256

(22) Filed: Mar. 8, 2019

(65) Prior Publication Data
US 2019/0278081 A1    Sep. 12, 2019

Related U.S. Application Data (60) Provisional application No. 62/642,613, filed on Mar. 14, 2018, provisional application No. 62/640,578, filed on Mar. 9, 2018.

(30) Foreign Application Priority Data

Dec. 26, 2018 (TW) .................. 107147251

(51) Int. Cl.
*G02B 27/01* (2006.01)
*G02B 3/00* (2006.01)
*G02B 27/09* (2006.01)

(52) U.S. Cl.
CPC ....... *G02B 27/0101* (2013.01); *G02B 3/0037* (2013.01); *G02B 27/0966* (2013.01); *G02B 2027/0123* (2013.01)

(58) Field of Classification Search
USPC ............................................. 345/7
See application file for complete search history.

(56) References Cited

U.S. PATENT DOCUMENTS

| 5,829,858 A * | 11/1998 | Levis | ................. H04N 9/315 |
| | | | 353/122 |
| 6,804,066 B1 * | 10/2004 | Ha | .................. G02B 5/1814 |
| | | | 359/683 |

(Continued)

FOREIGN PATENT DOCUMENTS

| CN | 2278227 | 4/1998 |
| CN | 104321681 | 1/2015 |

(Continued)

OTHER PUBLICATIONS

"Office Action of Taiwan Related Application No. 108107798", dated May 22, 2019, pp. 1-7.

(Continued)

*Primary Examiner* — Dorothy Harris
(74) *Attorney, Agent, or Firm* — JCIPRNET (57) ABSTRACT

An augmented reality (AR) device including at least one optical module is provided. Each of the at least one optical module sequentially includes a transparent display, a first lens, a second lens, and a third lens from a display side to an eye side. The first lens has a negative refractive power. The second lens has a negative refractive power. The third lens has a positive refractive power. The number of lenses of the optical module having refractive powers is three, wherein the transparent display of the optical module is configured to emit a light beam, and the light beam sequentially passes through the first lens, the second lens, and the third lens to be incident into a user's eyes at the eye side, so that an AR virtual image on the display side is seen by the eyes.

12 Claims, 10 Drawing Sheets

(56) References Cited

U.S. PATENT DOCUMENTS

| | | | |
|---|---|---|---|
| 8,269,652 B2 | 9/2012 | Seder et al. | |
| 8,872,766 B2 | 10/2014 | Moore et al. | |
| 9,036,096 B2 | 5/2015 | Lee et al. | |
| 2010/0254001 A1* | 10/2010 | Jang | G02B 30/56 |
| | | | 359/743 |
| 2012/0120498 A1* | 5/2012 | Harrison | G06F 3/012 |
| | | | 359/630 |
| 2012/0287040 A1 | 11/2012 | Moore et al. | |
| 2014/0019005 A1 | 1/2014 | Lee et al. | |
| 2014/0376091 A1* | 12/2014 | Jordan | G02B 27/4205 |
| | | | 359/627 |
| 2015/0143234 A1 | 5/2015 | Norris, III | |
| 2016/0025978 A1 | 1/2016 | Mallinson | |
| 2016/0110921 A1 | 4/2016 | Takahashi et al. | |
| 2016/0284129 A1 | 9/2016 | Nishizawa et al. | |
| 2017/0131762 A1 | 5/2017 | Liang | |
| 2017/0153662 A1* | 6/2017 | Tsai | G02B 27/0172 |
| 2017/0171533 A1* | 6/2017 | Benitez | G02B 30/27 |
| 2017/0219826 A1 | 8/2017 | Haseltine et al. | |
| 2017/0219828 A1* | 8/2017 | Tsai | G02B 27/123 |
| 2017/0242220 A1* | 8/2017 | Lee | G02B 13/06 |
| 2017/0248769 A1 | 8/2017 | Stamenov | |
| 2017/0322410 A1 | 11/2017 | Watson et al. | |
| 2017/0357092 A1 | 12/2017 | Griffin et al. | |
| 2018/0074497 A1 | 3/2018 | Tsuji et al. | |
| 2018/0144355 A1 | 5/2018 | Holman et al. | |
| 2018/0196231 A1* | 7/2018 | Bone | G02B 25/001 |
| 2018/0203240 A1 | 7/2018 | Jones et al. | |
| 2018/0218661 A1* | 8/2018 | Guenter | G09G 3/006 |
| 2018/0231741 A1* | 8/2018 | Dai | G02B 9/62 |
| 2018/0292660 A1 | 10/2018 | Eastwood | |
| 2019/0179149 A1 | 6/2019 | Curtis et al. | |
| 2020/0035205 A1 | 1/2020 | Nishibe et al. | |

FOREIGN PATENT DOCUMENTS

| | | |
|---|---|---|
| CN | 104536129 | 4/2015 |
| CN | 105137590 | 12/2015 |
| CN | 105573486 | 5/2016 |
| CN | 106526851 | 3/2017 |
| CN | 106666909 | 5/2017 |
| CN | 106991924 | 7/2017 |
| CN | 107015361 | 8/2017 |
| CN | 104660859 | 10/2017 |
| CN | 104062759 | 1/2018 |
| CN | 105812777 | 2/2018 |
| CN | 106918916 | 2/2018 |
| CN | 107683497 | 2/2018 |
| CN | 107703620 | 2/2018 |
| JP | 2013109050 | 6/2013 |
| TW | 181681 | 4/1992 |
| TW | 201326895 | 7/2013 |
| TW | 201506444 | 2/2015 |
| TW | M504249 | 7/2015 |
| TW | 201626046 | 7/2016 |
| TW | I565971 | 1/2017 |
| TW | I589929 | 7/2017 |
| TW | I597623 | 9/2017 |

OTHER PUBLICATIONS

"Notice of Allowance of Taiwan Counterpart Application," dated May 14, 2019, pp. 1-5.

"Office Action of U.S. Appl. No. 16/296,258", dated Apr. 16, 2020, pp. 1-34.

"Office Action of China Related Application, Application No. 201910175651.7", dated Feb. 1, 2021, p. 1-p. 10.

"Office Action of US Related Application, U.S. Appl. No. 16/296,258", dated Jan. 25, 2021, p. 1-p. 20.

Zhang Hang et al., "Design of light distribution of honeycomb Fresnel lens array", Optical Instruments, Feb. 28, 2016, pp. 53-58.

Satoshi Hasegawa et al., "Lens Accommodation to the Stereoscopic Vision on HMD", Virtual and Mixed Reality, Dec. 31, 2009, pp. 439-444.

"Office Action of China Counterpart Application", dated Jan. 12, 2021, p. 1-p. 9.

"Notice of allowance of China Counterpart Application", dated Jul. 29, 2021, p. 1-p. 4.

* cited by examiner

AUGMENTED REALITY DEVICE

CROSS-REFERENCE TO RELATED APPLICATION

This application claims the priority benefits of U.S. provisional application No. 62/640,578, filed on Mar. 9, 2018, U.S. provisional application No. 62/642,613, filed on Mar. 14, 2018, and Taiwan application no. 107147251, filed on Dec. 26, 2018. The entirety of each of the above-mentioned provisional patent applications is hereby incorporated by reference herein and made a part of this specification.

TECHNICAL FIELD

The technical field relates to an augmented reality (AR) device.

BACKGROUND

Near-eye display devices, such as virtual reality (VR), augmented reality (AR), or mixed reality (MR), are one of the trends in terms of the use of future display devices. Since the current near-eye display devices mostly adopt a non-direct-view type system, for instance, using a beam splitter, a waveguide sheet, or a reflective mirror to project display information to users' eyes, thus the efficiency of the optical systems of the near-eye display devices are lower than 35%. Therefore, the non-direct-view type near-eye display devices consume an excessive amount of power and are not suitable for being worn for a long time. Besides, if the direct-view-type near-eye display device is used, and the visible viewing angle is required to be greater than 70 degrees, the system thickness of the near-eye display device may be greater than 100 mm. Thus, the direct-view-type near-eye display device encounters the issue of excessive volume.

In another aspect, the visible distance of the existing near-eye display devices (i.e., the distance from the users' eyes to the optical system) is shorter than 50 mm. Such a short distance (less than 50 mm) cannot guarantee any comfortable viewing experience for the users. Moreover, the existing AR devices are required to be used together with specific carriers. Hence, the users are not allowed to use different carriers according to their preferences. When using the existing AR devices, users' fields of vision are blocked. As a result, if the AR devices are applied for driving navigation, a driving safety concern may be raised.

SUMMARY

In an embodiment of the disclosure, an augmented reality (AR) device includes at least one optical module. Each of the at least one optical module sequentially includes a transparent display, a first lens, a second lens, and a third lens from a display side to an eye side. The first lens has a negative refractive power. The second lens has a negative refractive power, wherein a paraxial region of at least one of an eye side surface and a display side surface of the second lens is a concave surface or a structure having an optical function equal to a concave surface, and at least one of the eye side surface and the display side surface of the second lens is aspheric. The third lens has a positive refractive power. A paraxial region of at least one of an eye side surface and a display side surface of the third lens is a convex surface or a structure having an optical function equal to a convex surface, and at least one of the eye side surface and the display side surface of the third lens is aspheric. The number of lenses having the refractive powers in each of the at least one optical module is three, wherein the transparent display of the optical module is configured to emit a light beam, and the light beam sequentially passes through the first lens, the second lens, and the third lens to be incident into a user's eyes at the eye side, so that an AR virtual image on the display side is seen by the eyes.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles described herein.

DETAILED DESCRIPTION OF EMBODIMENTS

Figure 1A:
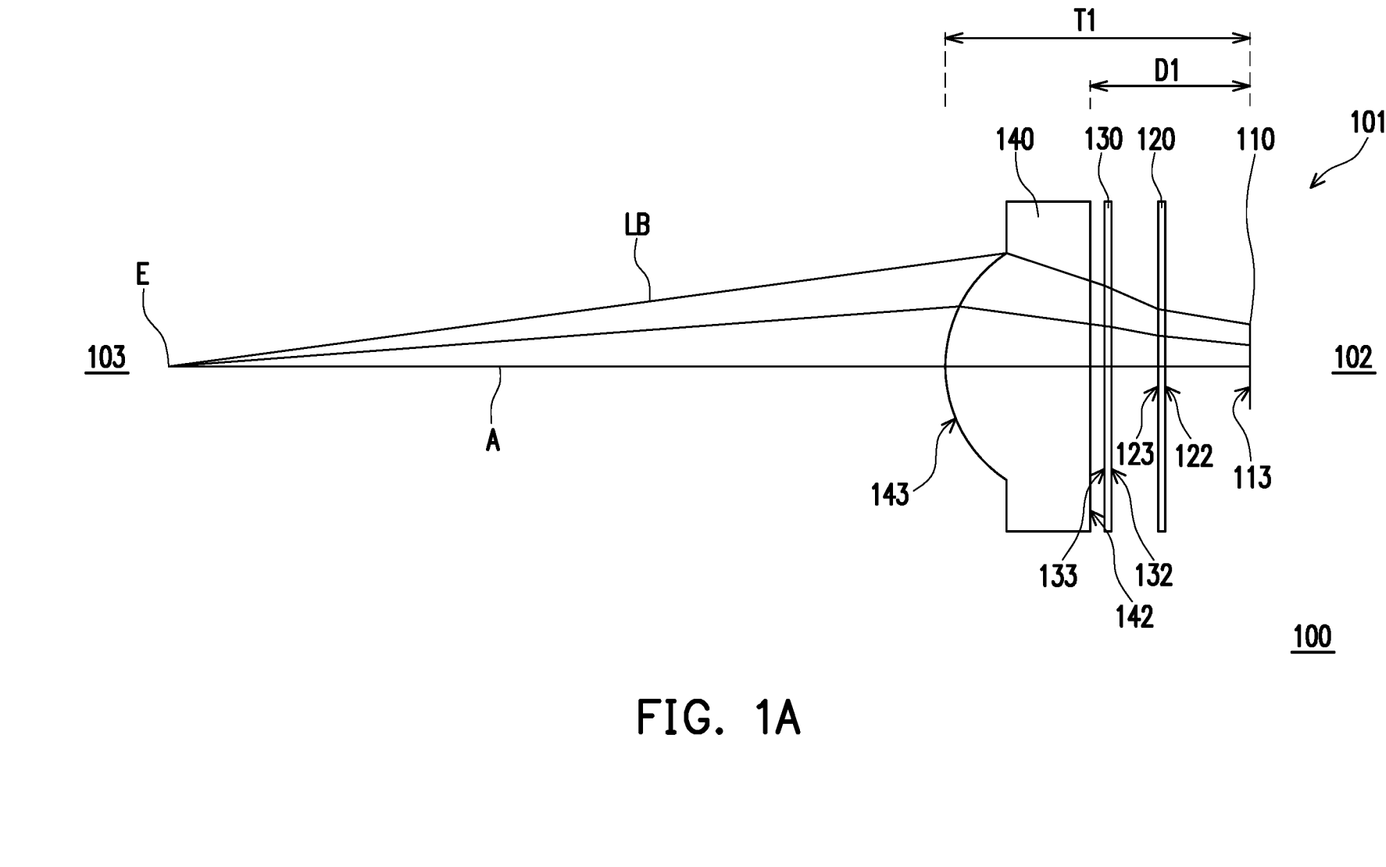
FIG. 1A is a schematic view of an augmented reality (AR) device according to an embodiment of the disclosure.
Figure 1B:
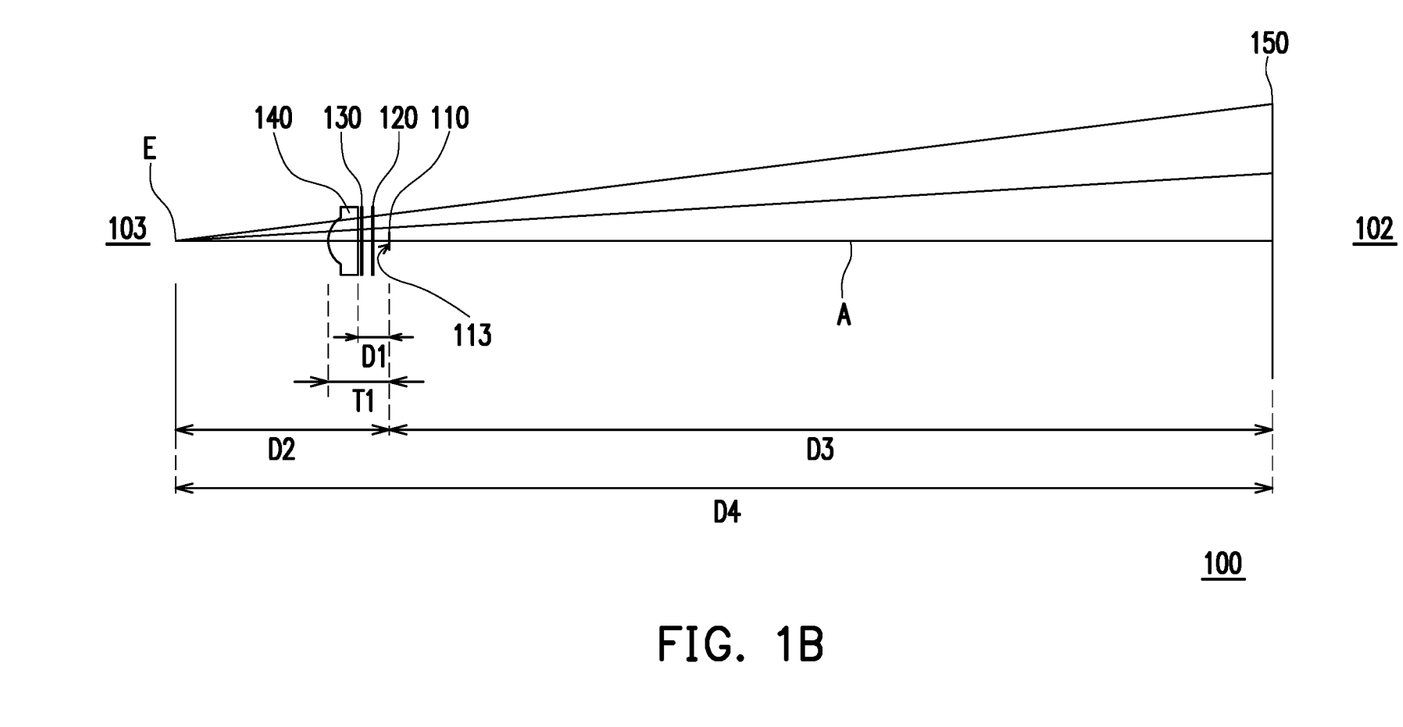
FIG. 1B is a far view of FIG. 1A.

FIG. 1A is a schematic view of an augmented reality (AR) device according to an embodiment of the disclosure. FIG. 1B is a far view of FIG. 1A. With reference to FIG. 1A and FIG. 1B, an AR optical device 100 provided in the present embodiment includes at least one optical module 101. Each of the at least one optical module 101 sequentially includes a transparent display 110, a first lens 120, a second lens 130, and a third lens 140 from a display side 102 to an eye side 103. Here, the eye side 103 is adjacent to the user's eyes E, and the display side 102 is adjacent to the transparent display 110.

In the present embodiment, the first lens 120 has a negative refractive power, wherein a paraxial region (i.e. a region near an optical axis A) of an eye side surface 123 of the first lens 120 is a concave surface, and the eye side surface 123 of the first lens 120 is aspheric. The second lens 130 has a negative refractive power, wherein a paraxial region (i.e. a region near an optical axis A) of at least one of an eye side surface 133 and a display side surface 132 of the second lens 130 is a concave surface or a structure having an optical function equal to a concave surface (i.e. a liquid crystal lens for diverging lights), and at least one of the eye side surface 133 and the display side surface 132 of the second lens 130 is aspheric. The third lens 140 has a positive refractive power, wherein a paraxial region (i.e. a region near an optical axis A) of at least one of an eye side surface 143 and an display side surface 142 of the third lens 140 is a convex surface or a structure having an optical function equal to a convex surface (i.e. a liquid crystal lens for converging lights), and at least one of the eye side surface 143 and the display side surface 142 of the third lens 140 is aspheric. The number of lenses having refractive powers in each of the at least one optical module 101 is three, wherein the transparent display 110 of the optical module 101 is configured to emit a light beam LB, and the light beam LB sequentially passes through the first lens 120, the second lens 130, and the third lens 140 to be incident into the user's eyes E at the eye side 103, so that an augmented reality (AR) virtual image 150 on the display side 102 is seen by the eyes E.

In the present embodiment, the transparent display 110 allows the user to simultaneously see a background image behind the display and a displayed image displayed by the display through the display. Namely, the user is able to see the background image at the display side 102 of the AR optical device 100 and the AR virtual image 150 through the transparent display 110. The transparent display 110 is, for instance, an organic light-emitting diode (OLED) display, a liquid crystal display (LCD), or any other appropriate display, and the type of the transparent display 110 is not limited to the seven-segment display shown in the drawings. The transparent display 110 may be a normal flat panel display having a rectangular pixel array for displaying an image on a plane.

Figure 2:
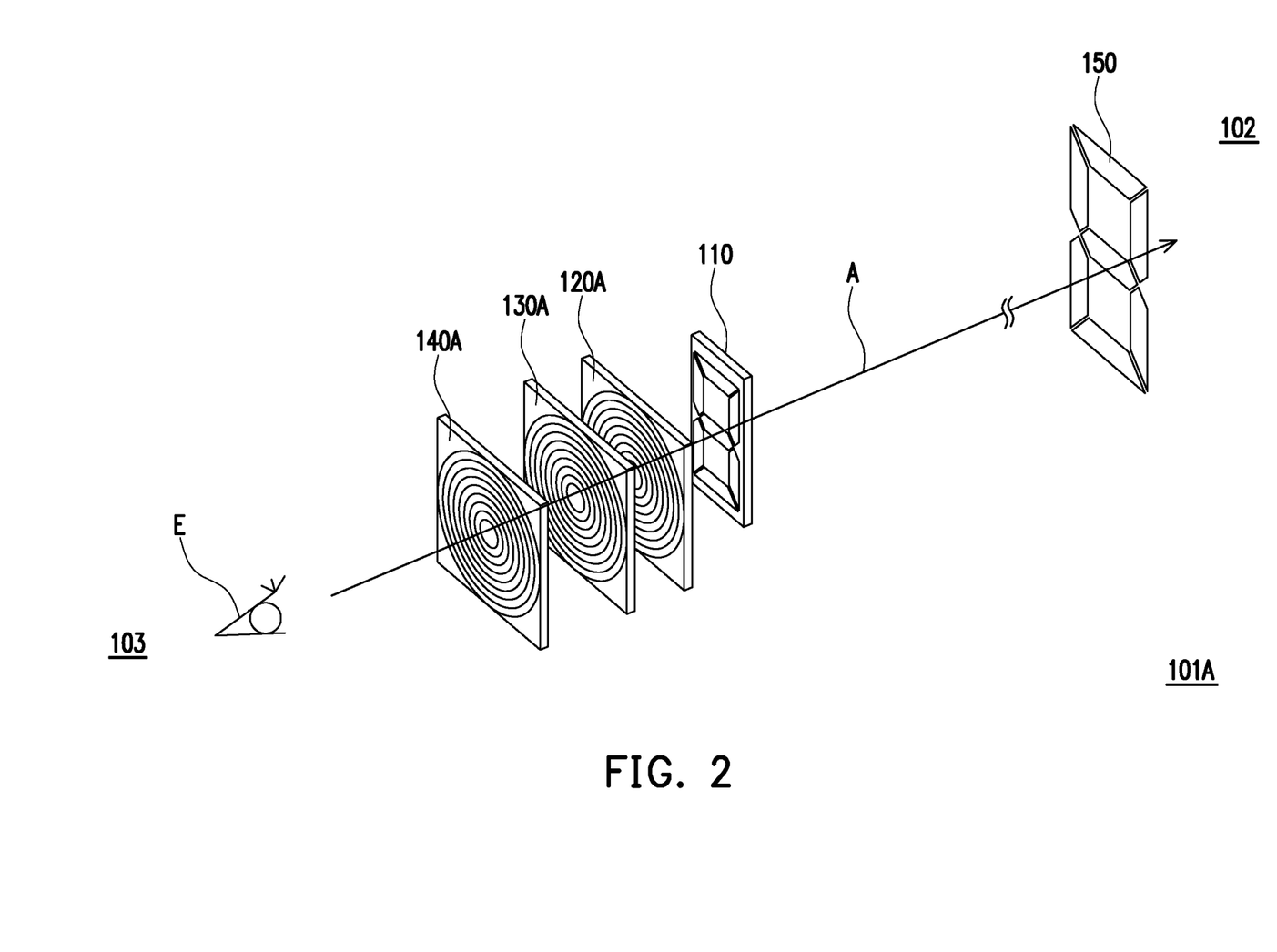
FIG. 2 illustrates a first example of an optical module of an AR device according to an embodiment of the disclosure.
Figure 3:
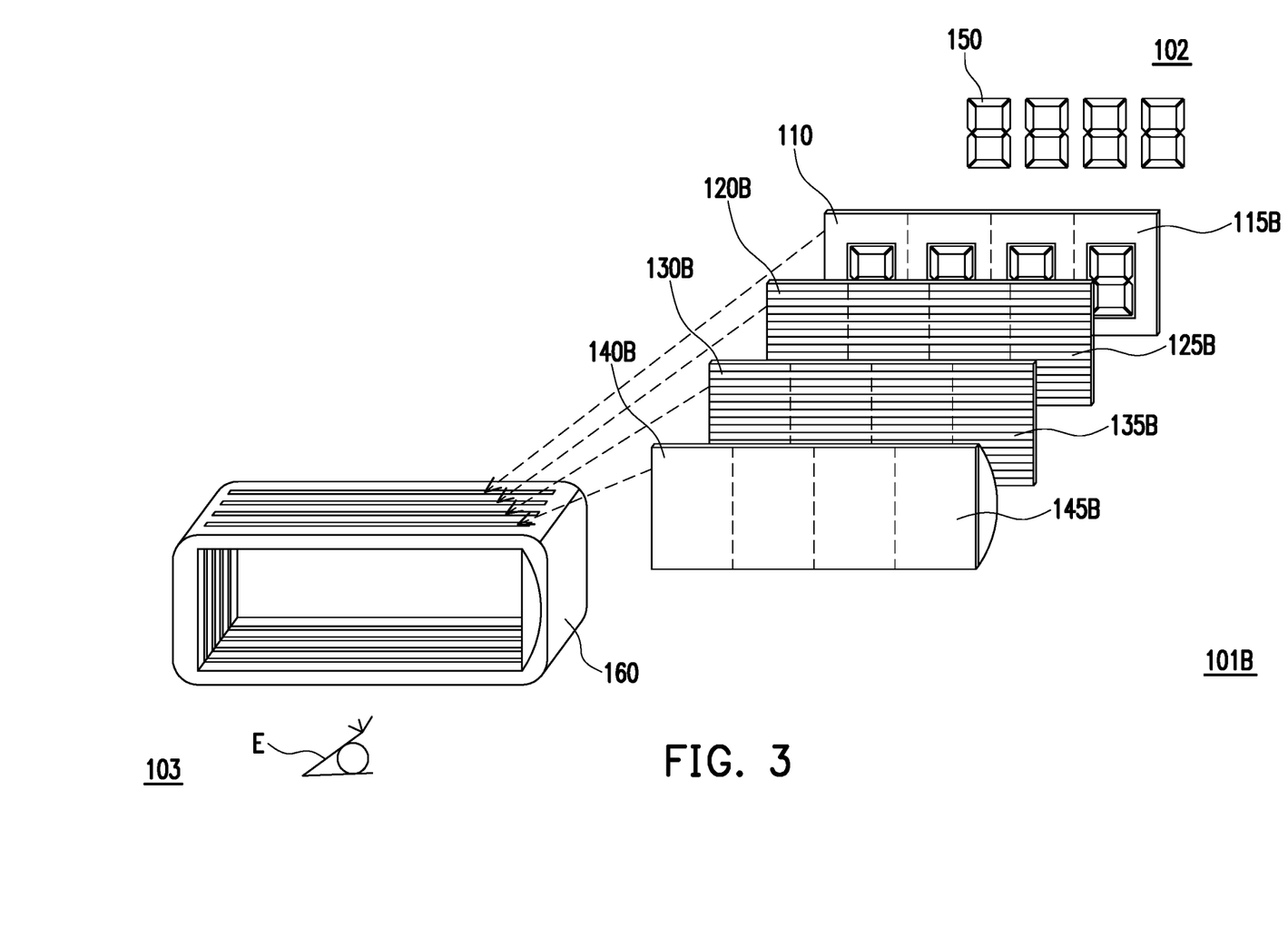
FIG. 3 illustrates a second example of the optical module of the AR device according to an embodiment of the disclosure.
Figure 4:
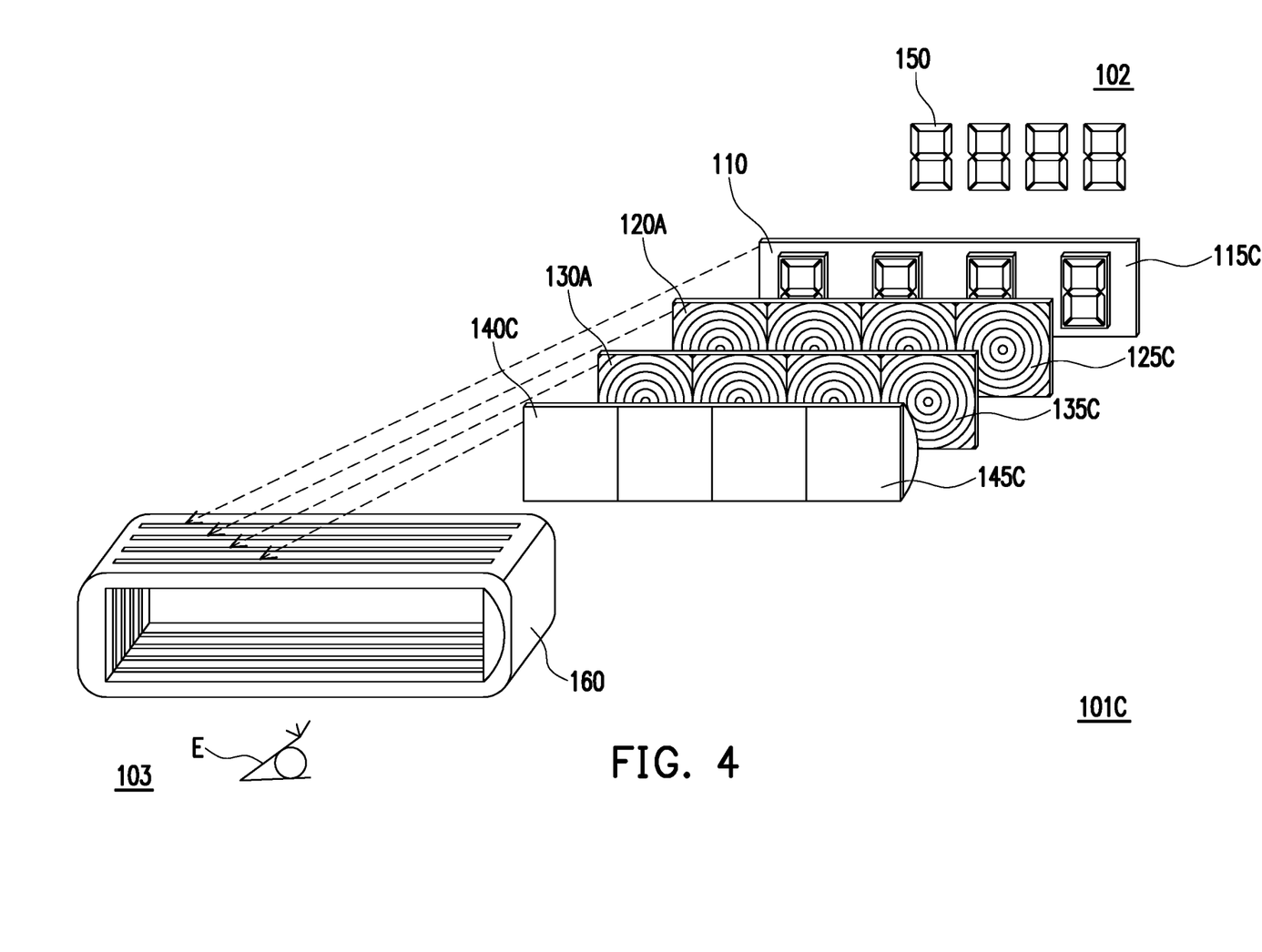
FIG. 4 illustrates a third example of the optical module of the AR device according to an embodiment of the disclosure.
Figure 5:
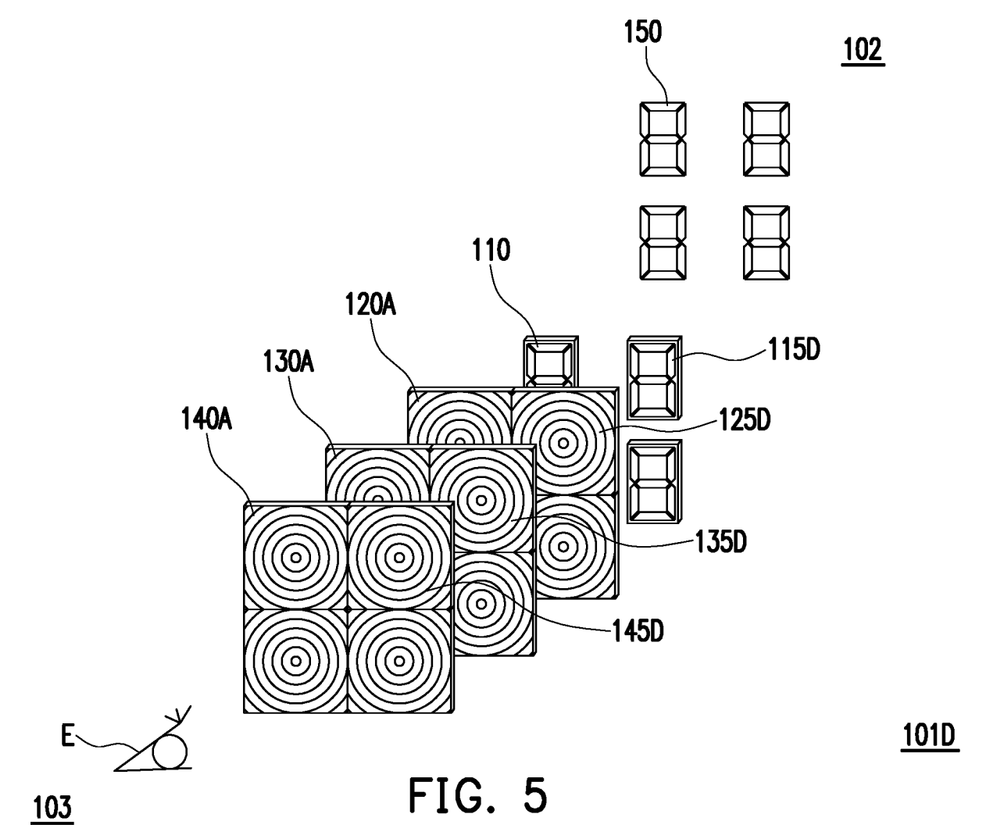
FIG. 5 illustrates a fourth example of the optical module of the AR device according to an embodiment of the disclosure.

FIG. 2 illustrates a first example of an optical module of an AR device according to an embodiment of the disclosure. FIG. 3 illustrates a second example of the optical module of the AR device according to an embodiment of the disclosure. FIG. 4 illustrates a third example of the optical module of the AR device according to an embodiment of the disclosure. FIG. 5 illustrates a fourth example of the optical module of the AR device according to an embodiment of the disclosure.

With reference to FIG. 2 to FIG. 5, for instance, the first lens 120, the second lens 130, and the third lens 140 of the optical module 101 provided in the present embodiment can include a Fresnel lens, a lens having a continuous curved surface, a cylindrical lens, or a combination thereof. For instance, the first lens 120A, the second lens 130A, and the third lens 140A of the optical module 101A depicted in FIG. 2 are circular Fresnel lenses featuring circular symmetry.

In an embodiment, two of the first lens 120, the second lens 130, and the third lens 140 of the optical module 101 are Fresnel lenses, and the other one is a lens having a continuous curved surface. For instance, the first lens 120B and the second lens 130B of the optical module 101B depicted in FIG. 3 are cylindrical Fresnel lenses, and the third lens 140B is a cylindrical lens. For instance, the first lens 120A and the second lens 130A of the optical module 101C depicted in FIG. 4 are circular Fresnel lenses featuring circular symmetry, and the third lens 140C is a lens having a continuous curved surface.

Besides, in the present embodiment, the number of the at least one optical module 101 is plural, and the optical modules 101 are arranged in an array. For instance, the first lenses 120 of the optical modules 101 form a first lens assembly, the second lenses 130 of the optical modules 101 form a second lens assembly, the third lenses 140 of the optical modules 101 form a third lens assembly, and at least one of the first lens assembly, the second lens assembly, and the third lens assembly is connected to form an integrally formed cylindrical Fresnel lens or an integrally formed cylindrical lens, or forms a cylindrical lens array, a ring-shaped Fresnel lens array (i.e. a circular Fresnel lenses featuring circular symmetry), or an array of lenses having continuous curved surfaces. Besides, at least one of the first lens assembly, the second lens assembly, and the third lens assembly forms the ring-shaped Fresnel lens array or the array of lenses having the continuous curved surfaces, and the ring-shaped Fresnel lens array or the array of lenses having the continuous curved surfaces is a linear array or a planar array.

For instance, the first lenses 120B of the first lens assembly 125B and the second lenses 130B of the second lens assembly 135B depicted in FIG. 3 are connected to form an integrally formed cylindrical Fresnel lens, and the third lenses 140B of the third lens assembly 145B are connected to form an integrally formed cylindrical lens or a linear cylindrical lens array. For instance, the first lenses 120A of the first lens assembly 125C and the second lenses 130A of the second lens assembly 135C depicted in FIG. 4 respectively form a ring-shaped Fresnel lens array, and the third lenses 140C of the third lens assembly 145C form an array of lenses having the continuous curved surfaces. The first lens assembly 125C, the second lens assembly 135C, and the third lens assembly 145C are linear arrays. For instance, the first lenses 120A of the first lens assembly 125D, the second lenses 130A of the second lens assembly 135D, and the third lenses 140A of the third lens assembly 145D of at least one optical module 101D depicted in FIG. 5 form a ring-shaped Fresnel lens array, which is a planar array.

Besides, the ring-shaped Fresnel lens array depicted in FIG. 5 is a 2×2 array. This should however not be construed as a limitation in the disclosure, and the lens arrays depicted in FIG. 3, FIG. 4, and FIG. 5 may be m×n arrays or a combination of the linear array and the m×n array, wherein m and n are positive integers. For instance, the third lens assembly 145B depicted in FIG. 3 may be an m×n array. That is, the third lens assembly 145B may be an integrally formed cylindrical lens or a cylindrical lens array, wherein the cylindrical lens array may be a linear array or a planar array. When m=1 and n=1, the third lens assembly 145B are an integrally formed cylindrical lens. When m=1 and n>1, the third lens assembly 145B is a linear array. When m>1, the third lens assembly 145B is a linear array, for instance, each of the cylindrical lenses extends along a first direction, and the cylindrical lenses are arranged along a second direction. Here, the first direction is perpendicular to the second direction. When n>1 and m>1, the third lens assembly 145B is the planar array.

The first lens assemblies 125B to 125D, the second lens assemblies 135B to 135D, and the third lens assemblies 145B to 145D depicted in FIG. 3 to FIG. 5 may be lens arrays; in response thereto, the number of at least one transparent display 110 depicted in FIG. 3 to FIG. 5 may be plural, and the number of the transparent displays may be the same as the number of lenses of individual lens assemblies, so as to form a transparent display array. For instance, the transparent display assemblies 115B and 115C depicted in FIG. 3 and FIG. 4 are linear transparent display arrays, and the transparent display assembly 115D depicted in FIG. 5 is a 2×2 planar transparent display array. Besides, since the at least one transparent display 110 may be a transparent display array, at least one AR virtual image 150 located at the display side 102 and observed by the eyes E may be an AR virtual image array. Hence, the amount of the display information can be further increased in the AR optical device 100.

According to the present embodiment, note that the first lens 120, the second lens 130, and the third lens 140 are made of polymethylmethacrylate (PMMA) or polycarbonate (PC). In addition, the first lens 120, the second lens 130, and the third lens 140 with small thicknesses can be manufactured, so that the at least one optical module 101 is flexible. As such, the AR optical device 100 not only can comply with the surface curvature of each carrier and can be disposed on the surface of the carrier but also can have the increased viewing angle.

Besides, in order to easily use the AR optical device 100 provided in the present embodiment, the AR optical device 100 can be disposed in a frame, e.g., the frame 160 depicted in FIG. 3 and FIG. 4.

In view of the above, the AR device provided in the present embodiment has the direct-view-type design. Therefore, the efficiency of the optical system of the AR device is satisfactory. Besides, the issue of blocking the user's field of vision can be better prevented because at least one optical module adopts the transparent display. Moreover, the first, second, and third lenses of the at least one optical module can be lens arrays, and the transparent display of the at least one optical module can correspondingly be the transparent display array. Hence, the amount of the display information can be further increased in the AR device. Additionally, the at least one optical module of the AR device is flexible. As such, the AR device not only can comply with the surface curvature of each carrier and can be disposed on the surface of the carrier but also can have the increased viewing angle.

Based on the description of the AR optical device 100 provided in the aforesaid embodiments, the optical specification of the AR optical device 100 will be elaborated in the following embodiment.

Table 1 contains optical data of each optical element of the AR optical device according to an embodiment of the disclosure. With reference to FIG. 1A, FIG. 1B, and Table 1, the distance between the optical elements is calculated in the reverse direction of a light beam in a reversely tracking manner. Namely, in the present embodiment, the light beam LB is emitted from the display surface 113 of the transparent display 110 of the AR optical device 100. The light beam LB sequentially passes through the first lens 120, the second lens 130, and the third lens 140 to be incident into the user's eyes E at the eye side 103, so that the AR virtual image 150 on the display side 102 is seen by the eyes E. However, the distance indicated in Table 1 is calculated in the reverse direction of the light beam in the reversely tracking manner, i.e. assuming that a parallel image beam is emitted from the user's eyes E at the eye side 103, and the image beam sequentially passes through the third lens 140, the second lens 130, and the first lens 120 and is focused on the display surface 113 of the transparent display 110 to generate an image.

TABLE 1

| Element | Surface | Radius of Curvature (mm) | Distance (mm) | Semi-diameter (mm) | Mechanical semi-diameter (mm) |
|---|---|---|---|---|---|
| 150 | | infinity | −500 | 61.3923 | 61.3923 |
| E | | infinity | 70 | 1 | 1 |
| 140 | 143 | 9.7727 | 13 | 10.1199 | 15 |
| | 142 | infinity | 2.5108 | 7.8290 | 15 |

TABLE 1-continued

| Element | Surface | Radius of Curvature (mm) | Distance (mm) | Semi-diameter (mm) | Mechanical semi-diameter (mm) |
|---|---|---|---|---|---|
| 130 | 133 | −13 | 0.5 | 7.1897 | 7.1897 |
| | 132 | infinity | 4.2853 | 7.0459 | 15 |
| 120 | 123 | −13 | 0.5 | 5.0829 | 5.0829 |
| | 122 | infinity | 5.0043 | 5.0353 | 15 |
| 110 | 113 | infinity | 0 | | |

It can be learned from the radius of curvature in Table 1 that the display surfaces 122-142 of the first to third lenses 120-140 are plane surface, paraxial regions (i.e. regions near the optical axis A) of the eye side surfaces 123 and 133 of the first lens 120 and the second lens 130 are concave surfaces, and a paraxial region (i.e. a region near the optical axis A) of the eye side surface 143 of the third lens 140 is a convex surface. The radius of curvature in Table 1 refers to the radius of curvature in a paraxial region (i.e. a region near the optical axis A).

Besides, the distance indicated in Table 1 refers to the distance between the surface where the optical element is located and the surface where the optical element in the next row is located, and the unit is millimeter (mm). Since the distance between the optical elements is calculated in the reverse direction of the light beam in the reversely tracking manner, the next optical element of the AR virtual image 150 is the user's eyes E, and the distance D4 therebetween is −500 mm. The distance between the other optical elements can be deduced from the above explanation and therefore will not be further explained hereinafter.

Note that the distance D2 between the display surface 113 of the transparent display 110 provided in the present embodiment and the user's eyes E is approximately 95.8 mm. Additionally, the distance D3 between the AR virtual image 150 and the display surface 113 of the transparent display 110 is approximately 404.2 mm. Hence, the AR virtual image 150 is an enlarged virtual image, which allows the user to observe the display information. Moreover, according to the present embodiment, the distance D3 between the AR virtual image 150 and the display surface 113 of the transparent display 110 is greater than 250 mm, and therefore the user can clearly and comfortably observe the display information of the transparent display 110.

In another aspect, the system thickness of the AR optical device 100 provided in the present embodiment, i.e., the distance T1 from the display surface 113 of the transparent display 110 to the eye side surface 143 of the third lens 140 is approximately 25.8 mm. Accordingly, the AR optical device 100 has the advantage of slimness.

In the present embodiment, the optical module 101 satisfies the following conditions:

$-0.5 < f3/f1 < -2.5, -0.5 < f3/f2 < -2.5,$ and $0.65 < f1/f2 < 1.75,$ wherein f1 is a focal length of the first lens 120, f2 is a focal length of the second lens 130, and f3 is a focal length of the third lens 140.

In the present embodiment, the optical module 101 satisfies the following condition:

$0.6 < D1/f3 < 1.7,$ wherein the distance D1 is a distance from the display surface 113 of the transparent display 110 to the display side surface 142 of the third lens 140.

In the present embodiment, the optical module 101 satisfies the following condition:

$$0.5 < T1/\beta < 2.3.$$

Note that the semi-diameter indicated in Table 1 represents a semi-diameter of a region of each optical element which the light beam can pass through. Besides, mechanical semi-diameter defines an edge for mechanical purposes and includes the extension of the curved surface of each optical element exceeding the semi-diameter.

TABLE 2

Aspheric Coefficient

|   | Eye Side Surface 143 | Eye Side Surface 133 | Eye Side Surface 123 |
|---|---|---|---|
| K | −0.5390 | −2.3921 | 0.2044 |
| A | −3.2702E−03 | 2.3067E−02 | 1.8000E−02 |
| B | −3.2171E−05 | 1.0664E−04 | −3.3762E−05 |
| C | 1.5158E−07 | −3.6054E−07 | −8.4889E−06 |
| D | −8.7498E−10 | 1.0374E−09 | −4.1515E−07 |
| E | −5.3097E−12 | 1.3243E−11 | 6.4801E−10 |
| F | 2.3572E−14 | 1.6960E−13 | 1.9812E−10 |
| G | 1.2872E−16 | −6.6890E−15 | 3.8389E−12 |
| H | 3.3103E−19 | −3.3265E−16 | 4.1744E−14 |

Table 2 indicates aspheric coefficients of the eye side surfaces of the first lens, the second lens, and the third lens of the AR optical device according to an embodiment of the disclosure. Please refer to Table 2. The aspheric polynomial can be expressed by the following formula:

$$x = \frac{c'y^2}{1 + \sqrt{1-(1+K)c'^2 y^2}} + Ay^2 + By^4 + Cy^6 + Dy^8 + Ey^{10} + Fy^{12} + Gy^{14} + Hy^{16} \ldots,$$

wherein x is the sag in the direction of the optical axis A, c' is a reciprocal of a radius of osculating sphere, i.e., a reciprocal of the radius of curvature near the optical axis A, K is a conic constant, and y is an aspheric height, i.e., the height from the center of the lens to the edge of the lens. A to H respectively represent aspheric coefficients of different orders in the aspheric polynomial. In the present embodiment, the eye side surface 123 and the eye side surface 133 are Fresnel surfaces, and the aspheric coefficients listed in Table 2 serve to describe the shape of an effective refractive surface of each tooth of the Fresnel surface rather than describing the shape of the connection surface between two adjacent effective refractive surfaces. Moreover, the eye side surface 143 is a continuous curved surface in the present embodiment.

Figure 6:
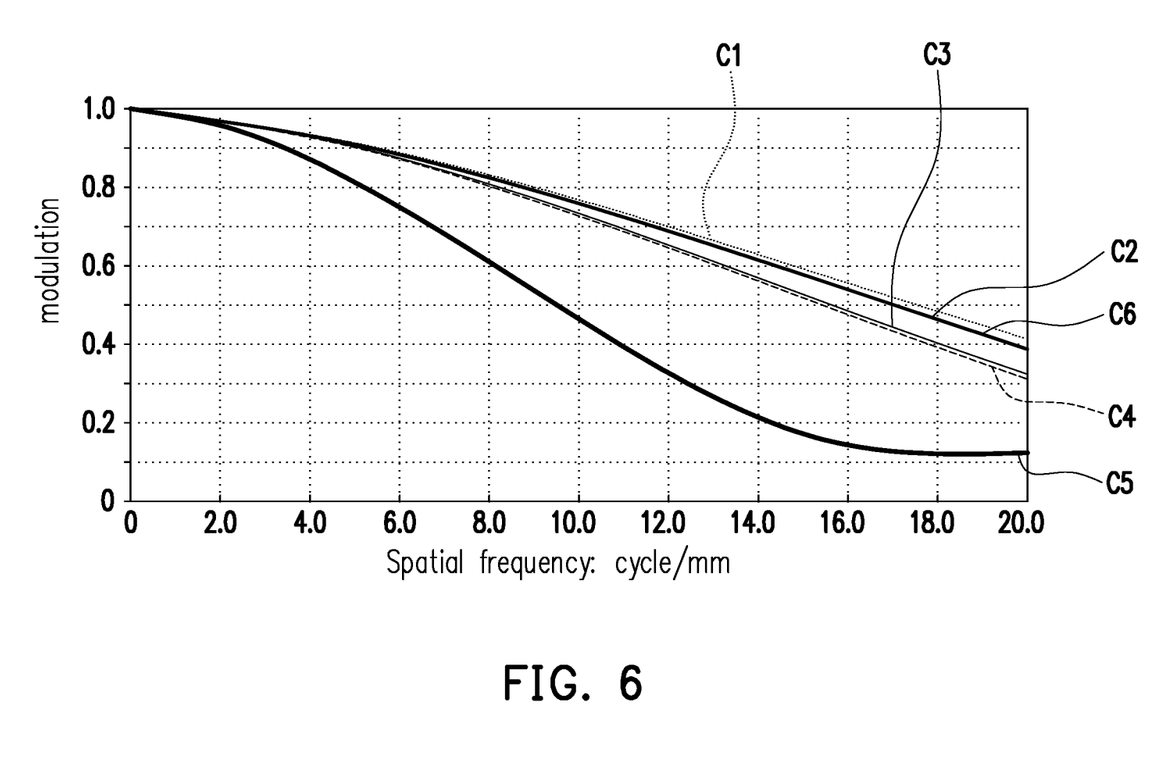
FIG. 6 is a curve diagram of a modulation transfer function (MTF) of an AR device according to an embodiment of the disclosure.
Figure 7A:
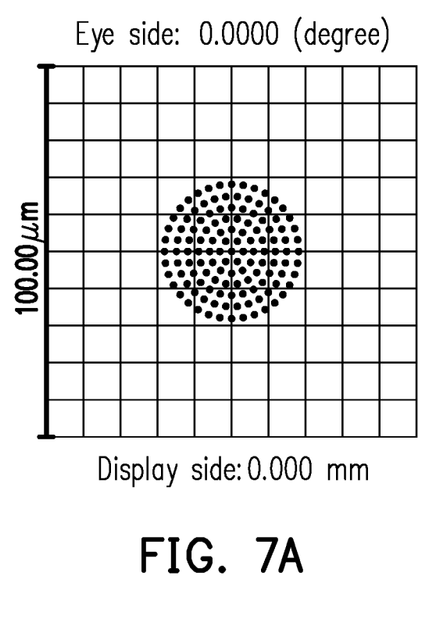
FIG. 7A to FIG. 7C illustrate systematic spot diagrams of an AR device according to an embodiment of the disclosure.
Figure 7B:
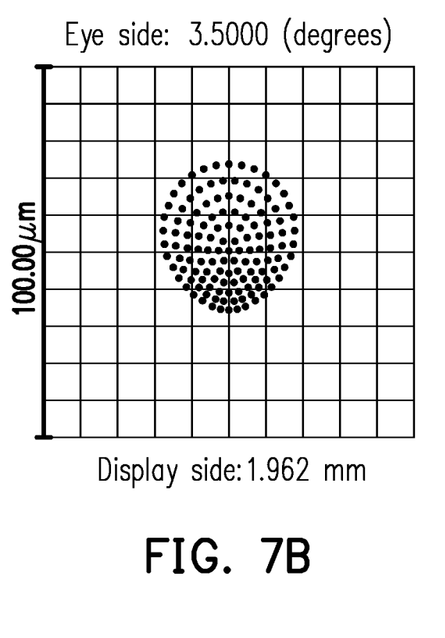
Figure 7C:
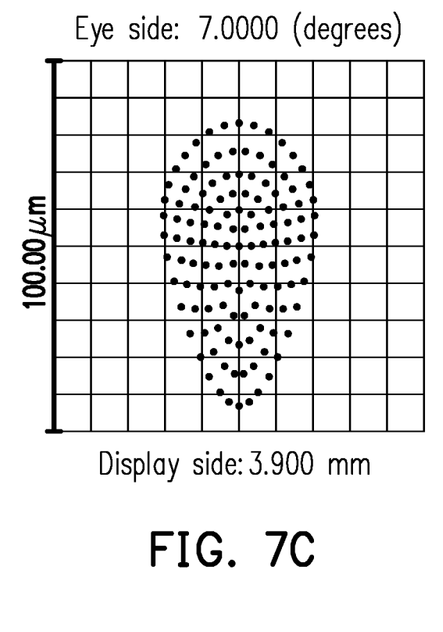
Figure 8A:
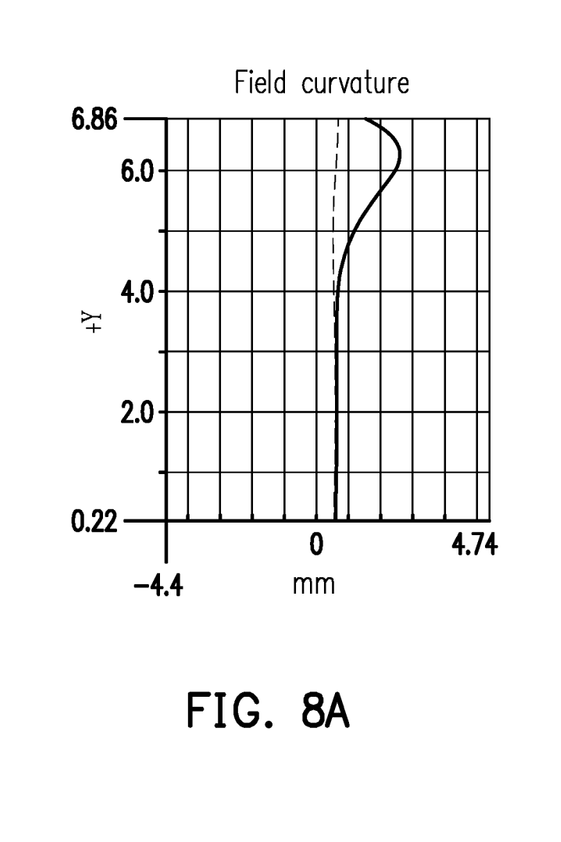
FIG. 8A illustrates field curvature aberration of an AR device according to an embodiment of the disclosure.
Figure 8B:
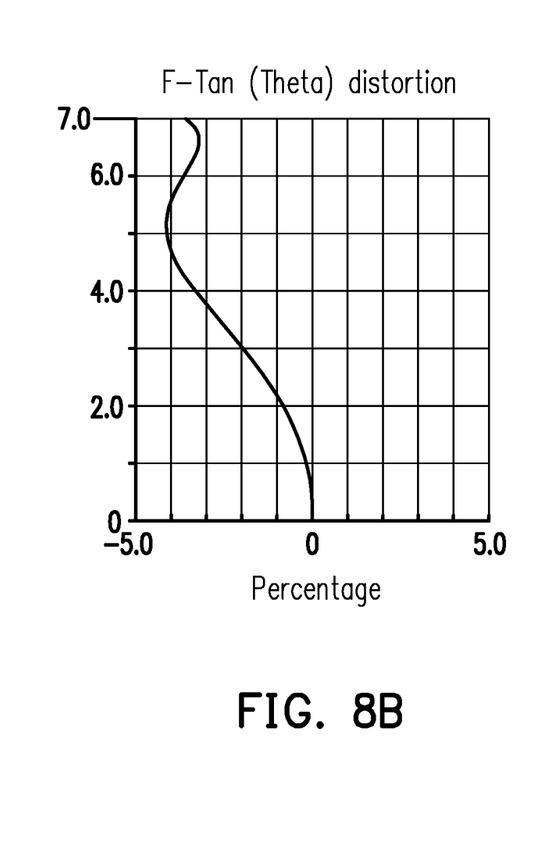
FIG. 8B illustrates distortion aberration of an AR device according to an embodiment of the disclosure.

FIG. 6 is a curve diagram of a modulation transfer function (MTF) of an AR device according to an embodiment of the disclosure. FIG. 7A to FIG. 7C illustrate systematic spot diagrams of an AR device according to an embodiment of the disclosure. FIG. 8A illustrates field curvature aberration of an AR device according to an embodiment of the disclosure. FIG. 8B illustrates distortion aberration of an AR device according to an embodiment of the disclosure.

With reference to FIG. 6, which is a curve diagram of the MTF of the AR optical device 100 according to the present embodiment, the maximum value of the vertical axis is 1, which indicates the full passage of the light beam, and the horizontal axis is a spatial frequency in unit of cycle/mm. Curves C1 to C6 are respectively measured at different angles. For instance, the solid curves C2, C3, and C5 are curves at 0 degree, 3.5 degrees, and 7.0 degrees in a Meridional direction, and the dotted curves C1, C4, and C6 are curves at 3.5 degrees, 7.0 degrees, and 0 degree in a Sagittal direction. The solid curve C2 and the dotted curve C6 are two coinciding curves. Besides, the simulation provided in FIG. 6 is done with use of the light beam having the wavelength of 550 nm.

In FIG. 7A to FIG. 8B, the simulation is done with use of the light beam having the wavelength of 550 nm, the dotted curve shown in FIG. 8A corresponds to the curve in the Sagittal direction, and the solid curve corresponds to the curve in the Meridional direction. The vertical axis depicted in FIG. 8A and FIG. 8B represents half field of view in unit of degree. It can be learned from FIG. 6 to FIG. 8B that the AR optical device 100 provided in the present embodiment has favorable optical quality.

To sum up, the AR device provided in the present embodiment has the direct-view-type design. Therefore, the efficiency of the optical system of the AR device is satisfactory. Besides, the issue of blocking the user's field of vision can be better prevented because at least one optical module adopts the transparent display. Moreover, the first, second, and third lenses of the at least one optical module can be lens arrays, and the transparent display of the at least one optical module can correspondingly be the transparent display array. Hence, the amount of the display information can be further increased in the AR device. Additionally, the at least one optical module of the AR device is flexible. As such, the AR device not only can comply with the surface curvature of each carrier and can be disposed on the surface of the carrier but also can have the increased viewing angle.

In addition, the transparent display of the AR device provided in one or more embodiments of the disclosure is located within the system focal length, so that the AR virtual image generated by the AR device can achieve the effect of extending the image plane. Hence, the AR virtual image projected by the AR device does not affect the user to watch the background image (can be considered as a parallel light beam at an infinite distance), so as to better prevent the issue of blocking the user's field of vision. Besides, the AR virtual image generated by the AR device provided in one or more embodiments of the disclosure is the enlarged virtual image, so as to allow the user to clearly observe the display information. Moreover, the distance between the AR virtual image and the transparent display is greater than 250 mm, and therefore the user can clearly and comfortably observe the display information of the transparent display. That is, the optical module of the AR device provided in one or more embodiments of the disclosure adopts three Fresnel lenses or two Fresnel lenses with one lens having a continuous curved surface, so that the background image can be clearly formed, and the distance between the AR virtual image and the transparent display can be greater than the distance of distinct vision of the user. In addition, the system thickness of the AR optical device provided in one or more embodiments of the disclosure is less than 26 mm. Accordingly, the AR optical device has the advantage of slimness.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An augmented reality device comprising:
at least one optical module, each of the at least one optical module from a display side to an eye side sequentially comprising:
a transparent display;
a first lens, located closer to the eye side than the transparent display, having a negative refractive power;
a second lens, located closer to the eye side than the first lens, having a negative refractive power, wherein a paraxial region of at least one of an eye side surface and a display side surface of the second lens is a concave surface or a structure having an optical function equal to a concave surface, and at least one of the eye side surface and the display side surface of the second lens is aspheric; and
a third lens, located closer to the eye side than the second lens, having a positive refractive power, wherein a paraxial region of at least one of an eye side surface and a display side surface of the third lens is a convex surface or a structure having an optical function equal to a convex surface, at least one of the eye side surface and the display side surface of the third lens is aspheric, and the number of lenses having the refractive powers in each of the at least one optical module is three, wherein
the transparent display of the at least one optical module is configured to emit a light beam, and the light beam sequentially passes through the first lens, the second lens, and the third lens to be incident into a user's eyes at the eye side, so that an augmented reality virtual image on the display side is seen by the eyes,
light from a background is transmitted through the transparent display, the first lens, the second lens, and the third lens in sequence, and then transmitted to the eyes, and
each of the first lens and the second lens is a flat-plate-type Fresnel lens, wherein surfaces of the first lens, the second lens, and the third lens facing away from the eyes are plane surfaces.

2. The augmented reality device according to claim 1, wherein the first lens, the second lens, and the third lens of the at least one optical module comprise a Fresnel lens, a lens having a continuous curved surface, a cylindrical lens, or a combination thereof.

3. The augmented reality device according to claim 1, wherein two of the first lens, the second lens, and the third lens of the at least one optical module are Fresnel lenses, and the other one of the first lens, the second lens, and the third lens of the at least one optical module is a lens having a continuous curved surface.

4. The augmented reality device according to claim 1, wherein the at least one optical module satisfies:

$-0.5 < f3/f1 < -2.5, -0.5 < f3/f2 < -2.5,$ and $0.65 < f1/f2 < 1.75,$ wherein f1 is a focal length of the first lens, f2 is a focal length of the second lens, and f3 is a focal length of the third lens.

5. The augmented reality device according to claim 1, wherein the at least one optical module satisfies:

$0.6 < D1/f3 < 1.7,$ wherein D1 is a distance from a display surface of the transparent display to the display side surface of the third lens, and f3 is a focal length of the third lens.

6. The augmented reality device according to claim 1, wherein the at least one optical module satisfies:

$0.5 < T1/f3 < 2.3,$ wherein T1 is a distance from a display surface of the transparent display to the eye side surface of the third lens, and f3 is a focal length of the third lens.

7. The augmented reality device according to claim 1, wherein the number of the at least one optical module is plural, and the plurality of optical modules are arranged in an array.

8. The augmented reality device according to claim 1, wherein the at least one optical module is flexible.

9. The augmented reality device according to claim 1, wherein a paraxial region of the eye side surface of the first lens is a concave surface, and the eye side surface of the first lens is aspheric.

10. The augmented reality device according to claim 1, wherein the number of the at least one optical module is plural, the first lenses of the plurality of optical modules form a first lens assembly, the second lenses of the plurality of optical modules form a second lens assembly, the third lenses of the plurality of optical modules form a third lens assembly, and at least one of the first lens assembly, the second lens assembly, and the third lens assembly is connected to form an integrally formed cylindrical Fresnel lens or an integrally formed cylindrical lens, or forms a cylindrical lens array, a ring-shaped Fresnel lens array, or an array of lenses having continuous curved surfaces.

11. The augmented reality device according to claim 10, wherein at least one of the first lens assembly, the second lens assembly, and the third lens assembly forms the ring-shaped Fresnel lens array or the array of lenses having the continuous curved surfaces, and the ring-shaped Fresnel lens array or the array of lenses having the continuous curved surfaces is a linear array or a planar array.

12. The augmented reality device according to claim 10, wherein the cylindrical lens array is a linear array or a planar array.

* * * * *